3,644,512
Patented Feb. 22, 1972

3,644,512
PROCESS FOR CONVERTING BUTANE TO ACETIC ACID
Anatoli Onopchenko, Monroeville, Johann G. D. Schulz, Pittsburgh, and Richard Seekircher, Cheswick, Pa., assignors to Gulf Research & Development Company, Pittsburgh, Pa.
No Drawing. Filed Oct. 10, 1969, Ser. No. 865,495
Int. Cl. C07c 53/08
U.S. Cl. 260—533 R          5 Claims

ABSTRACT OF THE DISCLOSURE

A process for converting butane to acetic acid which comprises subjecting butane to reaction with molecular oxygen in acetic acid in the presence of a cobalt compound soluble in the reaction mixture and a xylene, such as para xylene.

This invention relates to a process for converting butane to acetic acid.

Butane can be oxidized to acetic acid by reaction with molecular oxygen in acetic acid solution in the presence of a cobalt compound soluble in the reaction mixture. Unfortunately, an exceedingly long induction period is required and oxidation over a long period of time is needed for the required oxidation. Thus, we have found, as shown hereinafter in Run No. 1 in Table I, that an induction period of 40 hours and a reaction time of 10 hours are required to obtain 74 percent conversion of normal butane. A free-radical generator, for example, methyl ethyl ketone, can be used to reduce the induction period and the reaction time. Here we have found, as shown hereinafter in Run No. 2 in Table I, that the presence of methyl ethyl ketone reduced the induction period to 45 minutes and the reaction time to four hours.

We have found that butane can be oxidized to acetic acid in the process defined above without the use of a free-radical generator, such as methyl ethyl ketone, provided a selected amount of a xylene, preferably para-xylene, is also present in the reaction mixture.

The only components needed in the reaction system to produce acetic acid are butane; an oxygen-containing gas; acetic acid; a xylene, such as ortho-, meta- or para-xylene, preferably para-xylene; and a cobalt compound soluble in the reaction mixture. To convert butane to acetic acid any gas containing molecular oxygen, such as oxygen itself or air, can be used. The amount of oxygen used is at least that amount stoichiometrically required to satisfy the reaction producing acetic acid at any level of conversion. Since at least one methyl substituent and in most cases substantially all of the methyl substituents on the xylene will be converted to carboxylic substituents, oxygen should be present in amounts stoichiometrically required to obtain xylene oxidation as well. Although complete utilization of oxygen may not occur in all cases, it is possible to use amounts in excess of those stoichiometrically required, for example, from about 1.5 to about 20 times molar excess.

Cobalt can be used in the form of any compound, preferably as a salt, soluble in the reaction mixture. Thus, the cobalt compound can be in the form of an inorganic compound or as an organic compound, for example, as a cobaltous or cobaltic chloride, sulfate, nitrate, acetate, propionate, butyrate, isovalerate, benzoate, toluate, terephthalate, naphthenate, salicylate, acetyl acetonate, etc. Of these we prefer to employ cobaltous or cobaltic acetate. The amount of cobalt compound, as cobalt, employed is critical and must be at least about 0.1 percent by weight, preferably from about 0.3 to about 3.0 percent by weight, based on the acetic acid initially in the reaction system. The amount of acetic acid to butane initially employed can vary over a wide range as long as a substantially homogeneous solution is initially present. For example, the weight ratio of acetic acid can be from about 1:1000 to about 1000:1, but preferably is in the range of about 1:10 to about 10:1. The amount of xylene used is at least about one percent by weight, preferably from about one to about 25 percent by weight, based upon acetic acid.

The reaction conditions are mild. For example, the temperature can be from about 150° to about 290° F., preferably from about 200° to about 250° F. Sufficient pressure should be maintained to keep the reagents in the liquid phase. A pressure of about 50 to about 1000 pounds per square inch gauge, preferably about 100 to about 600 pounds per square inch gauge, is sufficient. Reaction time, similarly, is not critical and is dependent merely upon the amount of conversion desired. Thus, a reaction period of about one minute to about 48 hours, preferably about 10 minutes to about eight hours can be used.

The desired reaction can be carried out in any suitable manner, batch or continuous, as long as intimate contact is maintained among the various components of the reaction system. Thus, acetic acid, butane, the xylene, for example, para xylene, and the cobalt compound, for example, cobaltous acetate, are placed in a closed reactor and the same is pressured to reaction pressure with oxygen. The mixture is then raised to reaction temperature while stirring. Additional oxygen is introduced into the reaction system to compensate for the oxygen taken up by the reaction. Reaction is discontinued at any time but preferably when further oxygen absorption ceases. The reaction mixture is then brought to atmospheric pressure, withdrawn from the reaction zone and cooled to ambient temperature. Volatile products that are present are thus flashed off. Assuming, for example, that paraxylene has been used during the reaction, a major portion thereof will have been converted to insoluble terephthalic acid and a minor portion to para toluic acid soluble in the reaction product. The mixture is then filtered to remove terephthalic acid therefrom and the filtrate diluted with sufficient water to precipitate any para toluic acid present. The latter is separated by filtration and the resulting filtrate is separated into its individual components by any convenient method to recover the desired acetic acid therefrom. Thus, by subjecting the latter filtrate to distillation, for example, at a temperature of about 100° to about 500° F. and a pressure of about 0.002 to about 100 pounds per square inch gauge, water formed during the reaction and acetic acid are removed overhead and the cobalt compound is left behind for further use.

The process can further be defined by the following.

A number of runs was carried out in a stainless steel, stirred autoclave having a capacity of one liter wherein normal-butane alone, para-xylene alone or a mixture of the two were subjected to the action of oxygen in the presence of a cobalt salt, cobaltous acetate tetrahydrate, in acetic acid. In Run No. 2 methyl ethyl ketone was also present as promoter. The pressure was maintained in the reactor by continuously introducing oxygen therein and withdrawing unreacted oxygen therefrom. At the end of the reaction period the reaction product was analyzed by gas chromatography. The results obtained are set forth below in Table I.

TABLE I

| Run Number | 1 | 2 | 3 | 4 | 5 | 6 | 7 |
|---|---|---|---|---|---|---|---|
| Charge data (grams): | | | | | | | |
| Co(OAc)$_2$.4H$_2$O | | | | | | | |
| Percent by weight cobalt | 25 | 25 | 20 | 20 | 20 | 5 | 10 |
| Metal based on acetic acid | 1.6 | 1.6 | 1.2 | 1.2 | 1.2 | 0.3 | 0.6 |
| Methyl ethyl ketone | | 25 | | | | | |
| Acetic acid | 360 | 350 | 400 | 400 | 400 | 400 | 400 |
| Normal butane | 100 | 100 | | 100 | 91 | 100 | 105 |
| Para xylene | | | 53 | 15 | 15 | 15 | 15 |
| Reaction conditions: | | | | | | | |
| Temperature, °F | 218 | 220 | 220 | 220 | 256 | 250 | 255 |
| Pressure, pounds per square inches oxygen | 300 | 300 | 300 | 300 | 300 | 300 | 300 |
| Reaction time, hours | 10 | 4 | 3 | 4 | 2.5 | (¹) | (²) |
| Induction period, hours | 40 | 0.75 | 1.6 | 2.5 | 0.75 | (¹) | (²) |
| Yield data: | | | | | | | |
| Grams normal butane reacted | 74 | 77 | | 75.4 | 69 | 1.5 | 24 |
| Percent normal butane reacted | 74 | 77 | | 75.4 | 76 | 1.5 | 23 |
| Grams para xylene reacted | | | 53 | 15 | 14 | 0.6 | 15 |
| Percent para xylene reacted | | | 100 | 100 | 100 | 4 | 100 |
| Efficiency to terephthalic acid | | | 48 | 90 | 85 | | 26 |
| Efficiency to para toluic acid | | | 49 | 10 | 15 | 100 | 74 |
| Efficiency to acetic acid | 81 | 75 | | 76 | 74 | | 73 |

¹ Total of 22.5 hours.
² Total of 24 hours.

The advantages of operating in accordance with the process defined and claimed herein are apparent from a study of the data in Table I. In Run No. 1 when butane was oxidized in the absence of methyl ethyl ketone the induction period was 40 hours and reaction time 10 hours and reaction ceased at 74 percent conversion with 81 percent yield to acetic acid. By using methyl ethyl ketone in Run No. 2 the induction period was reduced to 0.75 hour and reaction time to four hours. In the absence of methyl ethyl ketone in Run No. 4, but on addition of a small amount of para-xylene to the reaction mixture, induction and reaction times were correspondingly reduced. By operating in this manner, not only are excellent conversions and yields of acetic acid obtained, but the necessity of adding expensive methyl ethyl ketone has been eliminated. With para-xylene as the promoter instead, commercially attractive terephthalic acid is coproduced with high selectivity and purity. This is of particular significance as selective oxidation of para-xylene to terephthalic acid is normally not easily achieved. As shown in Run No. 3 although the oxidation of para-xylene progressed rather well with an induction period of but 1.6 hours and a reaction period of three hours, not all of the para-xylene was converted during the oxidation, for about one-half was converted to para-toluic acid and one-half to terephthalic acid. If, therefore, the results in Run No. 3 might have predicted the oxidation of para-xylene during the operation, the prediction would have been in the formation of about equal amounts of para-toluic acid and terephthalic acid. It can be ssen, however, that substantially all of the para-xylene in Run No. 4 was converted to desirable terephthalic acid. Operation at higher temperatures in Run No. 5 gave results substantially similar to those obtained in Run No. 4. That the amount of cobalt compound required during the operation is critical is apparent from Runs Nos. 6 and 7 wherein it is seen that the desired results were not obtained.

Obviously, many modifications and variations of the invention, as hereinabove set forth, can be made without departing from the spirit and scope thereof, and therefore only such limitations should be imposed as are indicated in the appended claims.

We claim:

1. In a process wherein normal butane is contacted with molecular oxygen in acetic acid in the presence of a cobalt salt soluble in the reaction mixture to convert said normal butane to acetic acid, the improvement which involves adding to the reaction mixture a xylene, the amount of cobalt compound, as cobalt, being at least about 0.6 percent by weight based upon the acetic acid, the weight ratio of acetic acid to butane initially present being from about 1:1000 to about 1000:1, the amount of xylene being at least about one percent by weight based upon the acetic acid, the reaction temperature being from about 150° to about 290° F., the reaction pressure being from about 50 to about 1000 pounds per square inch gauge and sufficient to maintain the reagents in the liquid phase and the reaction time being from about one minute to about 48 hours.

2. The process of claim 1 wherein the xylene is para-xylene.

3. The process of claim 1 wherein the cobalt compound is a cobalt acetate.

4. The process of claim 1 wherein the cobalt compound is cobaltous acetate tetrahydrate.

5. The process of claim 1 wherein the amount of cobalt is from 0.6 to about 3.0 percent by weight, the weight ratio of acetic acid to butane is from about 1:10 to about 10:1, the amount of xylene being from about one to about 25 percent by weight based upon the acetic acid, the reaction temperature being from about 200° to about 250° F., the reaction pressure being from about 100 to about 600 pounds per square inch gauge and the reaction time being from about 10 minutes to about eight hours.

References Cited

UNITED STATES PATENTS 3,483,250   12/1969   Sugarman _____ 260—533 R

FOREIGN PATENTS 165,607   12/1953   Australia _____ 260—533 C
1,020,797   2/1966   Great Britain _____ 260—533 C LORRAINE A. WEINBERGER, Primary Examiner R. D. KELLY, Assistant Examiner U.S. Cl. X.R.

260—524 R